(12) United States Patent
Wu

(10) Patent No.: US 11,139,571 B2
(45) Date of Patent: Oct. 5, 2021

(54) COMPACT DUAL-BAND MIMO ANTENNA

(71) Applicant: AAC Technologies Pte. Ltd., Singapore (SG)

(72) Inventor: Jing Wu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 41 days.

(21) Appl. No.: 16/706,834

(22) Filed: Dec. 9, 2019

(65) Prior Publication Data
US 2020/0212568 A1 Jul. 2, 2020

(30) Foreign Application Priority Data

Dec. 31, 2018 (CN) .......................... 201811650610.0

(51) Int. Cl.
*H01Q 5/30* (2015.01)
*H01Q 5/307* (2015.01)
*H01Q 9/42* (2006.01)
*H01Q 1/48* (2006.01)
*H04B 7/0413* (2017.01)

(52) U.S. Cl.
CPC ............. *H01Q 5/307* (2015.01); *H01Q 1/48* (2013.01); *H01Q 9/42* (2013.01); *H04B 7/0413* (2013.01)

(58) Field of Classification Search
CPC ................. H01Q 5/30–5/35; H01Q 1/24–1/48
See application file for complete search history.

(56) References Cited

U.S. PATENT DOCUMENTS

| 6,662,028 B1 * | 12/2003 | Hayes ................. H01Q 1/243 343/908 |
| 9,484,631 B1 * | 11/2016 | Napoles ............... H01Q 5/371 |
| 9,711,858 B1 * | 7/2017 | Lee ........................ H01Q 9/06 |

(Continued)

FOREIGN PATENT DOCUMENTS

| CN | 104953290 B2 | 9/2015 |
| CN | 206236793 B1 | 6/2017 |
| CN | 109742527 A1 | 5/2019 |

OTHER PUBLICATIONS

PCT search report dated Jan. 15, 2020 by SIPO in related PCT Patent Application No. PCT/CN2019/111288 (4 Pages).

(Continued)

*Primary Examiner* — Hasan Islam
(74) *Attorney, Agent, or Firm* — W&G Law Group

(57) ABSTRACT

A compact dual-band MIMO antenna is provided, including: a system ground unit, a radiation arm having an open-circuit end and a short-circuit end, a first antenna formed at the open-circuit end and a second antenna formed at the short-circuit end. The first antenna includes a grounding arm connecting the radiation arm with the system ground unit, a first feeding arm located between the grounding arm and the open-circuit end, and a first parasitic arm connected to the system ground unit. The second antenna includes a second feeding arm located between the short-circuit end and the grounding arm, and a second parasitic arm connected to the system ground unit. Compared with the related art, the present invention has following beneficial effects: the antenna has compact and simple structure, high isolation, excellent performance in dual bands, a small volume and a light weight, and it is convenient for mass production.

5 Claims, 3 Drawing Sheets

(56) References Cited

U.S. PATENT DOCUMENTS

| | | | |
|---|---|---|---|
| 2004/0137950 A1* | 7/2004 | Bolin | H01Q 19/005 |
| | | | 455/562.1 |
| 2014/0333504 A1* | 11/2014 | Basirat | H01Q 1/362 |
| | | | 343/893 |
| 2015/0116183 A1* | 4/2015 | Tay | H01Q 5/378 |
| | | | 343/860 |

OTHER PUBLICATIONS

1st Office Action dated Mar. 16, 2020 by SIPO in related Chinese Patent Application No. 201811650610.0 (6 Pages).

* cited by examiner

COMPACT DUAL-BAND MIMO ANTENNA

TECHNICAL FIELD

The present invention relates to the field of communications technologies, and in particular, to a compact dual-band MIMO antenna.

BACKGROUND

With the development of mobile communication technology, Multiple-Input Multiple-Output (MIMO) technology has received great attention as an important means to improve a data transmission rate. By utilizing the MIMO technology, a channel capacity can be increased, and reliability of the channel can also be improved, and a bit error rate is reduced. Moreover, the MIMO technology is considered as one of alternative key techniques for next-generation communication (5G) technology. However, the MIMO antenna is an important part of the MIMO system, and its performance directly affects performance of the MIMO system. At present, the MIMO antenna technology faces many critical difficulties, such as problems of antenna coupling and polarization isolation. To reduce coupling between the antennas, improving isolation is a main content in studying the antenna system. To solve these problems, many structures that greatly increase the isolation between the antennas begin to come into people's attention.

BRIEF DESCRIPTION OF DRAWINGS

Many aspects of exemplary embodiment can be better understood with reference to following drawings. Components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further illustrated with reference to the accompanying drawings and the embodiments.

Figure 1:
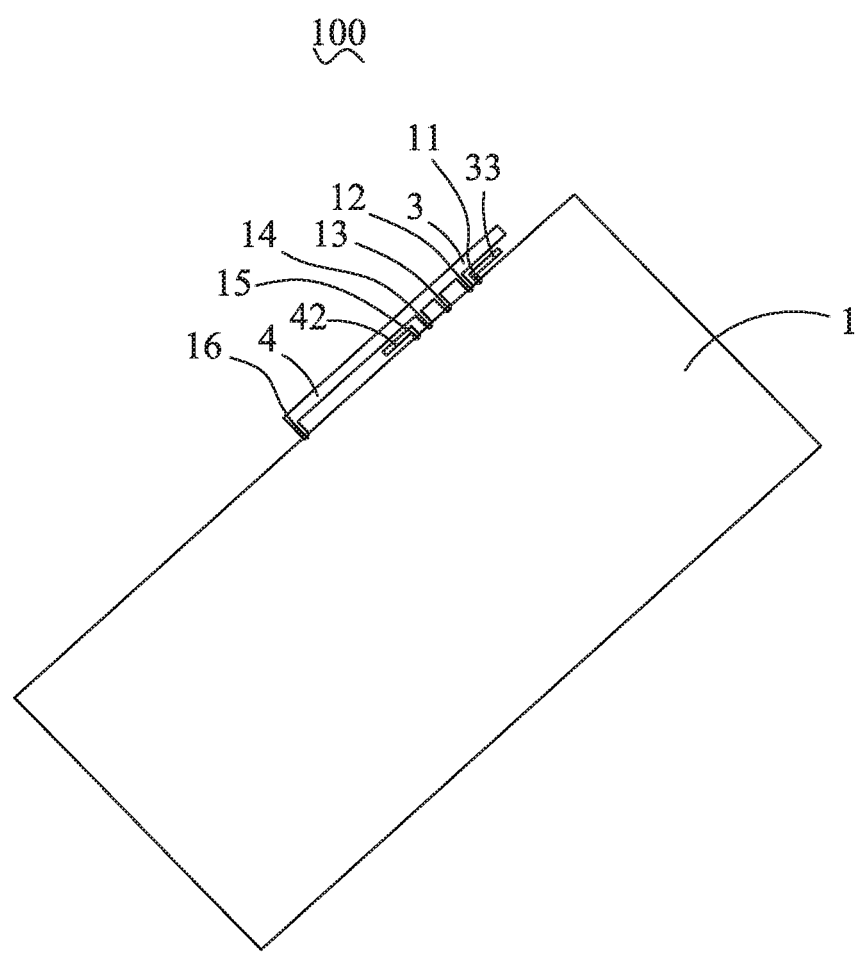
FIG. 1 is a partial structural schematic diagram of a compact dual-band MIMO antenna according to the present invention.
Figure 2:
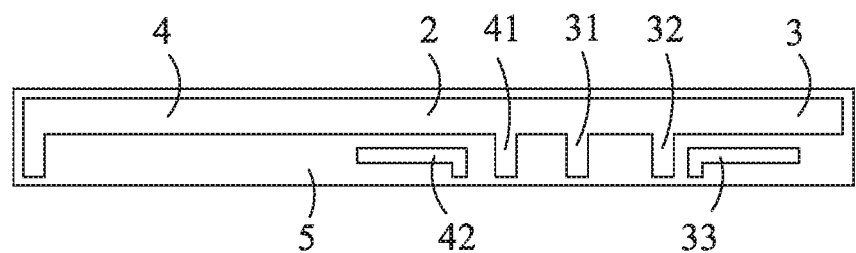
FIG. 2 is another partial structural schematic diagram of a compact dual-band MIMO antenna according to the present invention.

Referring to FIG. 1 and FIG. 2, the present invention provides a compact dual-band MIMO antenna 100, and the compact dual-band MIMO antenna 100 includes a system ground unit 1, a radiation arm 2 having an open-circuit end and a short-circuit end, a first antenna 3 formed at the open-circuit end, and a second antenna 4 formed at the short-circuit end. In one embodiment of the present invention, the first antenna 3 is an inverted F antenna, and the second antenna 4 is a loop antenna that forms an orthogonal mode with the inverted F antenna.

The first antenna 3 further includes a grounding arm 31 connecting the radiation arm 2 with the system ground unit 1, a first feeding arm 32 located between the grounding arm 31 and the open-circuit end, and a first parasitic arm 33 connected to the system ground unit 1. The second antenna 4 further includes a second feeding arm 41 located between the short-circuit end and the grounding arm 31, and a second parasitic arm 42 connected to the system ground unit 1.

The system ground unit 1 sequentially includes a first grounding point 11, a first feeding point 12, a second grounding point 13, a second feeding point 14, a third grounding point 15, and a fourth grounding point 16. The first grounding point 11 is connected to the first parasitic arm 33, and the first feeding arm 32 is connected to the first feeding point 12. The second grounding point 13 is connected to the grounding arm 31, and the second feeding point 14 is connected to the second feeding arm 41. The third grounding point 15 is connected to the second parasitic arm 42, and the fourth grounding point 16 is connected to the short-circuit end.

In one embodiment of the present invention, the first grounding point 11 is connected to an end of the first parasitic arm 33 close to the open-circuit end, and the third grounding point 15 is connected to an end of the second parasitic arm 42 close to the short-circuit end.

The compact dual-band MIMO antenna 100 further includes a substrate layer 5. The first antenna 3 and the second antenna 4 are disposed on the substrate layer 5. The substrate layer 5 is made of plastic, and the substrate layer 5 may be an antenna holder, a terminal back shell or a PBC.

The first antenna 3 and the second antenna 4 are formed on the substrate layer 5 by an FPC, LDS or PCB process. It is appreciated that, the present invention is not limited to specific processes, and any other feasible process should be also within the scope of the present invention.

Figure 3:
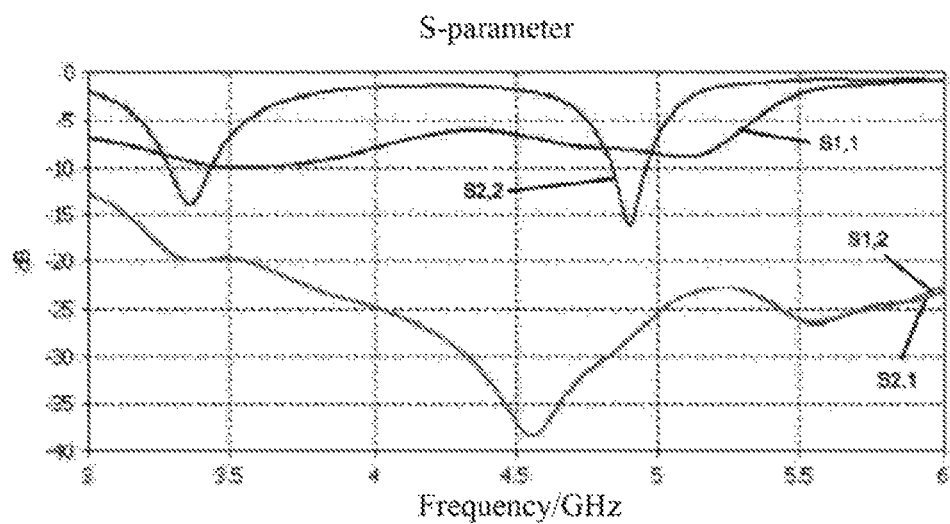
FIG. 3 illustrates S-parameter curves of a first antenna and a second antenna of a compact dual-band MIMO antenna according to the present invention.
Figure 4:
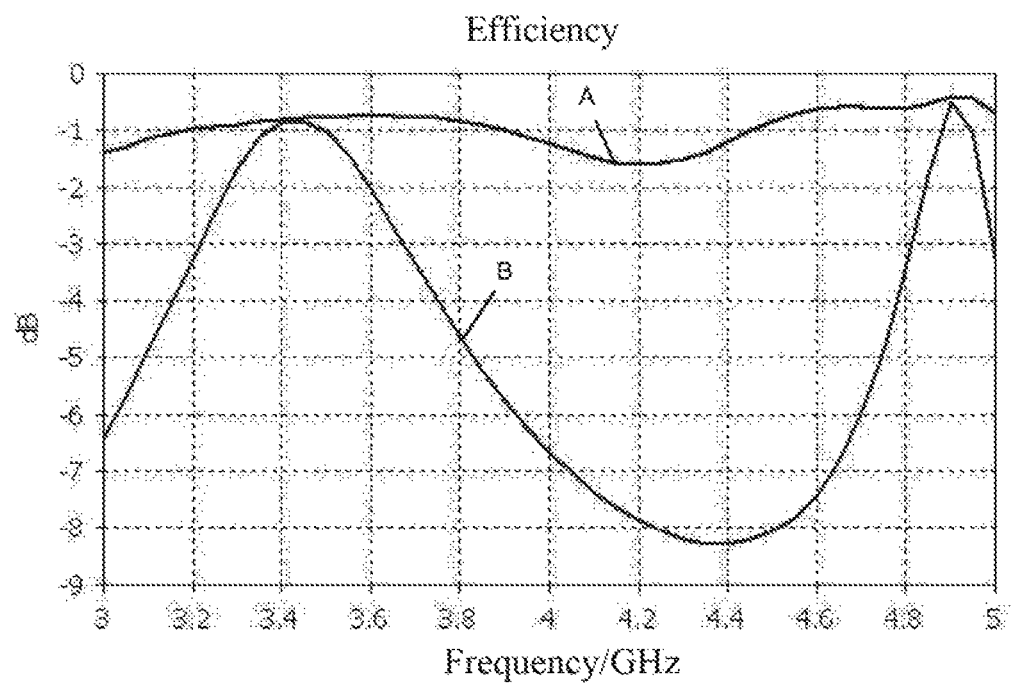
FIG. 4 illustrates efficiency curves of a first antenna and a second antenna of a compact dual-band MIMO antenna according to the present invention.
Figure 5:
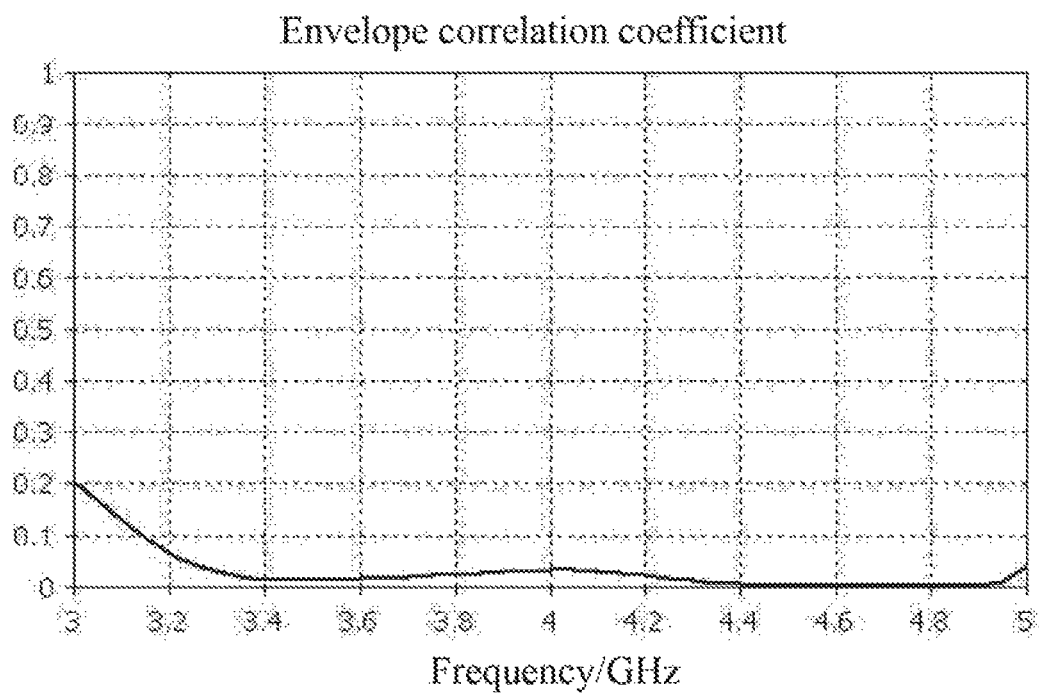
FIG. 5 illustrates an envelope correlation coefficient curve between a first antenna and a second antenna of a compact dual-band MIMO antenna according to the present invention.

For the performance of the compact dual-band MIMO antenna 100, reference is made to FIGS. 3-5. In FIG. 3, S1, 1 is a reflection coefficient of the first antenna 3, and S2, 2 is a reflection coefficient of the second antenna 4, and S1, 2 and S2, 1 may represent the isolation between the first antenna 3 and the second antenna 4. In FIG. 4, a curve A indicates the efficiency of the first antenna 3, and a curve B indicates the efficiency of the second antenna 4. As can be seen from the figures, both the first antenna 3 and the second antenna 4 can work in the band of Sub-6 GHz (3.3-3.6 GHz and 4.8-5.0 GHz), and the isolation is excellent in this band.

Compared with the related art, the present invention has following beneficial effects: the antenna has a compact structure and a high isolation; it has dual-band, and it has excellent performance in the dual bands; it has a simple structure, a small volume and a light weight, and it is convenient to manufacture and thus for mass production.

What have been described above are only embodiments of the present invention, and it should be noted herein that those skilled in the art can make improvements without departing from the inventive concept of the present invention, but these are all within the scope of the present invention.

What is claimed is:

1. A compact dual-band Multiple-Input Multiple-Output (MIMO) antenna, comprising:
   a system ground unit;
   a radiation arm having an open-circuit end and a short-circuit end; and a first antenna and a second antenna, the first antenna and the second antenna cooperate as the MIMO antenna;

wherein the first antenna comprises a grounding arm connecting the radiation arm with the system ground unit, a first feeding arm located between the grounding arm and the open-circuit end and a first parasitic arm connected to the system ground unit, and the second antenna comprises a second feeding arm located between the short-circuit end and the grounding arm and a second parasitic arm connected to the system ground unit, wherein the system ground unit sequentially comprises a first grounding point, a first feeding point, a second grounding point, a second feeding point, a third grounding point, and a fourth grounding point, wherein the first ground point is connected to the first parasitic arm, the first feeding arm is connected to the first feeding point, the second grounding point is connected to the grounding arm, the second feeding point is connected to the second feeding arm, the third grounding point is connected to the second parasitic arm, and the fourth grounding point is connected to the short-circuit end.

2. The compact dual-band MIMO antenna as described in claim 1, wherein the first antenna is an inverted-F antenna, and the second antenna is a loop antenna that forms an orthogonal mode with the-inverted F antenna.

3. The compact dual-band MIMO antenna as described in claim 1, wherein the first grounding point is connected to an end of the first parasitic arm close to the open-circuit end, and the third grounding point is connected to an end of the second parasitic arm close to the short-circuit end.

4. The compact dual-band MIMO antenna as described in claim 1, further comprising a substrate layer on which the first antenna and the second antenna are disposed.

5. The compact dual-band MIMO antenna as described in claim 4, wherein the first antenna and the second antenna are formed on the substrate layer by an FPC (Flexible Printed Circuit) process, an LDS (Laser Direct Structuring) process or a PCB (Printed Circuit Board) process.

* * * * *